(12) United States Patent
Oberkofler et al.

(10) Patent No.: US 6,174,358 B1
(45) Date of Patent: Jan. 16, 2001

(54) METHOD FOR PRODUCING CELLULOSE PARTICLES

(75) Inventors: Jörg Oberkofler, Seewalchen; Alexander Brandner, Laakirchen; Jeffrey F. Spedding, Anif; Anton Schmalhofer, Vienna, all of (AT)

(73) Assignee: Cellcat GmbH, Hallein (AT)

( * ) Notice: Under 35 U.S.C. 154(b), the term of this patent shall be extended for 0 days.

(21) Appl. No.: 09/160,071

(22) Filed: Sep. 24, 1998

(30) Foreign Application Priority Data

Sep. 24, 1997 (DE) ............................................. 197 42 165

(51) Int. Cl.⁷ ............................... C08B 16/00; C08L 1/28
(52) U.S. Cl. .................. 106/200.1; 106/163.01; 106/166.01; 106/166.4; 106/166.41; 106/166.42; 106/166.43; 106/166.8; 106/167.01; 106/200.2; 106/200.3; 106/200.4; 106/204.01; 264/180; 264/181; 264/349

(58) Field of Search ......................... 106/163.01, 166.01, 106/166.4, 166.41, 166.42, 166.43, 166.8, 167.01, 200.1, 200.2, 200.3, 200.4, 204.01; 264/180, 181, 349

(56) References Cited

PUBLICATIONS

CAPLUS 1999:468867, Mackiewicz et al, "Methods of manufacturing and collecting . . . ", Jul. 22, 1999.*

* cited by examiner

Primary Examiner—David Brunsman
(74) Attorney, Agent, or Firm—Fay, Sharpe, Fagan, Minnich & McKee, LLP

(57) ABSTRACT

A method for producing cellulose particles whereby a cellulose solution is dispersed in a regenerant or nonsolvent and the cellulose is regenerated or precipitated in dispersed form into cellulose particles.

14 Claims, No Drawings

METHOD FOR PRODUCING CELLULOSE PARTICLES

This invention relates to a method for producing cellulose particles and to an apparatus for carrying out this method.

The invention is based on the problem of providing a method and apparatus for producing cellulose particles which permit cellulose particles to be produced easily and cost-effectively. In particular, it should be possible to produce a plurality of particle shapes and sizes, in particular small particles, and to change over from one size to another without great effort. Furthermore, the method should permit cellulose particles to be produced which have cationic groups in the inside. Finally, the method and apparatus should allow the use of a plurality of initial substances, in particular for producing cationized products.

The invention is based on the finding that this problem can be solved by a method for producing cellulose particles wherein a cellulose solution is dispersed in a regenerant and the cellulose is regenerated and precipitated in dispersed form into cellulose particles.

The subject of the invention is a method characterized in that a cationizing agent is added to a cellulose solution, the cellulose solution mixed with cationizing agent is dispersed in a regenerant, the dispersion taking place under shear load, and the cellulose is regenerated and precipitated directly in dispersed form into longitudinally oriented, fibrous, cationized cellulose particles.

Such a method makes it possible to produce small cellulose particles directly, thereby eliminating an additional method step of grinding large cellulose particles. Moreover, this method can ensure a uniform size of the produced particles. Finally, the particles produced by this method have an advantageous structure since they are made by production of a fine dispersion.

Longitudinally oriented cellulose solution dispersion drops are preferably formed in the regenerant. These longitudinally oriented drops have a large surface, i.e. interface with the regenerant, so that the precipitation or regeneration can take place quickly and the drop size and shape adjusted in the dispersion thus determines the particle size and shape of the final product.

According to a preferred embodiment, the regeneration and precipitation of the cellulose particles takes place under high shear load. This shear load is crucial for fast formation and maintenance of a fine dispersion of the cellulose solution. By adjusting the shear load to different values one can thus vary the size of the particles to be produced. By high shear load one can e.g. adjust the size of the particles to be produced to small values. At high shear load a fine dispersion is produced which ensures fast precipitation or regeneration out of the dispersion in the form of small particles.

The cellulose solution is preferably mixed with a cationizing agent before being dispersed in the regenerant. By adding such a cationizing agent to the cellulose one can produce cationized cellulose particles by the inventive method. One can preferably thus also produce cellulose particles which have cationized groups in the inside. These are of high importance in particular for application in the paper and waste-water industries.

The cationizing agent is preferably added shortly before the regenerant is added. This addition directly before dispersion also permits cationized cellulose solutions which are unstable with respect to the regenerant to be used in the inventive method.

The dispersion and regeneration or precipitation step is preferably performed at a temperature greater than room temperature. The working temperature is preferably 40 to 85° C. These elevated temperatures accelerate the reactions, e.g. the regeneration of the cellulose or the precipitation. The production time can thus be reduced and the total method improved by elevated temperatures.

The cellulose concentration in the cellulose solution is preferably lower than 10 wt %, it being particularly preferred for the concentration to be in the range of 4 to 8 wt %. A low concentration in the cellulose solution minimizes the particle size in the inventive method. At the same time, a deficient concentration of cellulose in the cellulose solution is unfavorable for the strength of the particles to be produced. Moreover, a deficient concentration of cellulose unnecessarily increases the effort for processing the mother liquor from the process.

Solvents to be used for the cellulose are e.g. N-methylmorpholine-N-oxide, lithium chloride-dimethylacetamide, tetraamminecopper-copper(II) hydroxide (cuen or cuoxam). Further, one can use sodium hydroxide solution and carbon disulfide as solvents.

In a preferred embodiment, the regenerated cellulose particles are supplied to a twin screw extruder for degassing. Particularly in the viscose process, carbon disulfides and hydrogen sulfides arise during regeneration and must be removed before cleaning and dewatering of the cellulose particles. The use of a twin screw extruder for degassing ensures complete degassing, and this element can moreover be connected directly to the outflow pipe of the disperser.

For production one uses an apparatus wherein the disperser comprises a rotor and a stator each having a toothing, and wherein a mixing nozzle is disposed in the feed pipe for the cellulose to the disperser for passing in the regenerant or nonsolvent, the mixing nozzle comprising a plurality of pipes ending shortly before the gap formed between the toothing of the rotor and that of the stator. If the rotor runs in the stator, the toothing of the rotor is located on the outer circumference thereof and the toothing of the stator on the inner circumference thereof.

Between the toothings of the stator and rotor one can adjust a small gap causing a high shear force to be exerted on the cellulose solution and the regenerant or nonsolvent. Moreover, one can adjust the speed of the rotor and thus likewise influence the shear load in such an apparatus. In addition, this apparatus makes it possible to add the regenerant or nonsolvent directly before the disperser in which the dispersion is produced and the cellulose precipitated or regenerated. This permits the time between addition and dispersion to be kept to a minimum. This minimal time ensures that the cellulose is precipitated or regenerated in dispersed form. Finally, such an apparatus has the advantage that one can add before this disperser a mixing element in which the cellulose solution can optionally be provided with cationizing agent or the cellulose solution modified. This inventive apparatus also readily permits connection with degassing apparatuses or with devices for removing excess nonsolvent in the dissolved cellulose process.

The disperser is preferably a "pumping disperser". Such a disperser has the advantage that one can exactly adjust the shear load it produces on the phase mixture of cellulose solution/regenerant or nonsolvent and achieve high values. The pumping disperser preferably has three rotors in three successive dispersing zones. Repeated treatment of the material to be dispersed within an extremely short time and a high shearing rate as well as shear stress minimize the particle size in the dispersion. One can thus ensure that the precipitated cellulose particles have a small particle size.

The cellulose particles produced with the inventive method preferably have a mean particle size of 0.001 to 10 mm, preferably 0.01 to 5 mm and in particular 0.1 to 1 mm. This small particle size permits the cellulose particles to be used advantageously in different applications. A small particle size is advantageous in particular for use of the cellulose particles in paper plants or waste-water plants. In the paper industry, for example, the particle size may not be thicker than the paper thickness. Additionally, a low particle size can rule out forming problems.

The cellulose particles are preferably so constituted that cationic groups are immobilized in the inside of the particles. Such cellulose particles are suitable in particular for use in papermaking. The cationized groups in the cellulose permit interfering substances to be separated out of the papermaking process, whereby the presence of cationized groups even inside the cellulose permits a higher separation rate of interfering substances, thereby increasing the effectiveness of the cellulose particles.

The produced cellulose particles are preferably fibrids, i.e. fibrous particles with a fiber length of preferably no more than 1 mm. In this form there is the greatest possible surface on which the cellulose particles can enter into contact with other media. In particular with cationized particles, the effectiveness thereof is thus high during use, e.g. in papermaking.

The inventive cellulose particles are longitudinally oriented, i.e. their length is greater than their width. For example, the mean length is 1000 microns and the mean width, or particle diameter, 20 microns. Preferred ranges are 1/10 to 1/500 and in particular 1/20 to 1/100. The diameter of the particles is preferably no more than 50 microns and in particular no more than 20 microns.

The invention will be described in detail in the following.

For producing cellulose particles one first prepares a cellulose solution. One can do so in a mixing element, which can optionally be a "pumping disperser". One distinguishes in particular between cellulose solutions in which the cellulose is reacted chemically, e.g. so as to form a xanthate, and cellulose solutions in which the cellulose is present in solution. Cellulose particles are gained from these two solutions by regeneration in the former case and by precipitation with the aid of a nonsolvent in the latter case.

The cellulosic starting materials to be used for this solution can be cellulose or else cellulose derivatives in the form of esters and ethers. The cellulose derivatives can be produced e.g. by modifying the cellulose in a mixing element. Suitable starting materials are unsubstituted pulp, cellulose ester or ether, carboxymethylcellulose, hydroxyethylcellulose and cellulose sulfate, cellulose acetate, chitosan or alkali cellulose.

For producing a sodium xanthate one can react the alkali cellulose with carbon disulfide and dissolve it in sodium hydroxide solution. One can also use N-methylmorpholine-N-oxide, lithium chloride-dimethylacetamide, tetraamminecopper-copper(II) hydroxide (cuen or cuoxam) as solvents. In the case of water-soluble cellulose derivatives one can also use water as a solvent.

In the case of cationization of the cellulose solution, the cationic groups will be covalently bound to the hydroxyl group of the cellulose. However, binding is also possible via ions and/or hydrogen bridges.

The cellulose will preferably be mixed in dissolved form with a cationizing agent.

The cationizing agent used can be aluminum salts such as polyaluminum chloride or sodium aluminate. The polyaluminum chloride can be partly hydrolyzed. Use of the aluminate has the advantage that it can be precipitated with sulfuric acid together with the xanthate.

As cationizing agent one can further use cationic polyelectrolytes such as polydialkyldiallylammonium salts, in particular polydialkyldiallylammonium chloride, dicyandiamide, dicyandiamide condensate, polyamines, polyimines such as polyethylene imine or ionenes. Further cationizing agents used can be reactive monomers, for example primary, secondary and tertiary amines, quaternary ammonium bases each with at least one residue reactible with a hydroxyl group of the cellulose.

The regenerant used in the inventive method is usually an acid, generally diluted sulfuric acid. One can also use acetic acid or formic acid. In the N-methylmorpholine-oxide method one uses water or an aqueous amine oxide solution as the regenerant. In these systems the components will sometimes also be referred to as nonsolvents below.

The nonsolvent used can be N-methylmorpholine-N-oxide or lithium chloride-dimethylacetamide in aqueous solution and water. For regenerating the cellulose from xanthates one uses diluted sulfuric acid.

In particular the systems N-methylmorpholine-N-oxide and lithium chloride-dimethylacetamide are very sensitive to the nonsolvent water. The use of commercial aqueous additives has therefore been very restricted hitherto. The inventive method also permits such unstable solutions to be used, however. In the inventive method the harmful excess water is either removed in a degassing zone or the dwell time of the unstable cellulose solution before regeneration in the disperser is kept to under one second. One can ensure this short dwell time of the unstable cellulose solution in the inventive method by spacing the outflow from the mixing element as close as possible to the inflow to the disperser. One can thus avoid decomposition of the cellulose solution by a cationizing agent or a solvent for the cationizing agent. Furthermore, the addition of regenerant or nonsolvent takes place directly before the disperser. Thus, the cellulose solution is not decomposed by these agents either before dispersion has taken place. The nonsolvent or regenerant is introduced into the disperser via a mixing nozzle whose outlet is disposed directly before the dispersing zone of the disperser. However, it is also within the scope of the invention to use other manners of supplying the nonsolvent or regenerant as long as one ensures fast production and maintenance of a dispersion of the cellulose solution with the nonsolvent or regenerant so as to yield the cellulose particles with a small size.

The time between the addition of the nonsolvent or regenerant and the dispersion should be kept low. In the inventive method a dispersion with the desired small dispersion drops is produced within at most 1 s, preferably 0.5 s, in particular 0.2 s and in particular preferably under 0.1 s, after addition of the nonsolvent or regenerant. This short dispersion time is achieved in particular by the action of high shear load on the two phases, nonsolvent or regenerant and cellulose solution.

The shear load is preferably produced by a gap formed in the disperser between the toothings of the rotor and stator of the disperser. The size of this gap is in the micron range, for example 300 microns. In addition to the small gap size, the shear load is produced in particular by a high circumferential speed of the rotor. The circumferential speed is preferably 20 m/s. The shear load expressed by energy consumption is preferably 200 kWh/t (cellulose) in the inventive method.

The shear rate, for example at a gap of 300 microns, is preferably 10 to 80 m/s and in particular 20 to 40 m/s, whereby shear rates between 25 and 35 m/s have proven especially advantageous.

If the toothing on the rotor and/or stator is mounted at an angle to the particular axis of the rotor or stator, this can additionally achieve good transport of the dispersion through the disperser. The shear load necessary for regenerating small cellulose particles according to the inventive method can also be produced by other measures, however. One can e.g. use a disperser into which the two phases (cellulose solution/regenerant or nonsolvent) are introduced and in which these phases are dispersed and exposed to high shear loads e.g. by intensive stirring.

Use of a disperser with a rotor and stator each having a toothing has a positive influence on the particle shape to be achieved. The toothings of the rotor and stator cause pressure zones or reduced pressure zones to form in the dispersion of cellulose solution and regenerant or nonsolvent, leading to turbulence in the dispersion and thereby permitting the adjustment of high shear load and thus the production of small cellulose particles. The turbulence in addition causes the shear load to result in orientation of the cellulose drops, thereby permitting the formation of fibrids, i.e. fibrous particles. The dispersion drops produced according to the invention preferably have a diameter-to-length ratio of 1/50.

In cases where the produced cellulose particles are fibrids, these preferably have a length of 0.001 to 10 mm, particularly preferably 0.1 to 1 mm, in particular 500 to 800 microns. The thickness of the fibrids, i.e. their mean diameter, is preferably between 1 and 100 microns, particularly preferably between 5 and 50 microns and in particular between 10 and 30 microns.

In order to ensure reliable production of cellulose particles by the inventive method it is necessary to adjust the mixture of cellulose solution and nonsolvent or regenerant ideally. The ratio between the two phases must be so as to ensure that the nonsolvent or regenerant is present in the dispersion as a continuous phase, whereas the cellulose solution constitutes the discontinuous phase. If insufficient regenerant or nonsolvent is added, the cellulose has the function of the continuous phase in the dispersion, which would lead to production of a cellulose sponge that would be destroyed in the disperser and thus lead to uneven cellulose particles of poor quality.

In the inventive method the discontinuous phase is produced quickly in the form of cellulose solution dispersion drops in the disperser. These drops react on their surface with the regenerant, or the cellulose is precipitated on the surface by contact with the nonsolvent. This causes drops of a certain size and orientation at least having a cellulose skin on their surface to already form in the disperser. These particles are completely regenerated or precipitated either already in the disperser or in the outflow pipe of the disperser. The dimensions of the outflow pipe are preferably selected so that the particles, when leaving the pipe and being fed to the belt filter or the degassing device, have cellulose which is regenerated or precipitated completely, i.e. in the inside as well. As the outflow pipe for the disperser one can select for example a pipe with an inner diameter of 80 mm and a length of 1.5 to 2 m. Since a skin at least already forms on the surface of the drops in the disperser, the particles are prevented from uniting into large particles either in the disperser or in the outflow pipe, the drop size and shape adjusted in the dispersion instead constituting substantially the size and shape of the final product. The forces normally prevailing in the partly regenerated or partly precipitated particles, which would cause the particles to contract into balls, can be counteracted with the inventive particles by the longitudinal orientation incorporated in the dispersing zone. The inventive method can thus produce cellulose particles of different shapes, in particular also small-sized fibrids.

Consequently, the shape and size of the cellulose particles which can be produced by the inventive method are crucially determined by several parameters, or can be ideally adjusted through them. Along with the selected cellulose solution method, the concentration of cellulose in the cellulose solution, the temperature in the disperser and the quantity passed through the disperser are of special importance. In addition, the quantity of added nonsolvent or regenerant in relation to the cellulose solution is important. Finally, the particle size and shape are codetermined by the shear load applied in the disperser, the value thereof and the orientation caused thereby in the cellulose solution.

The cellulose particles obtained by the inventive method are first supplied to a degassing zone, when using the viscose process. In this zone the impure cellulose particles are freed of carbon disulfide, hydrogen sulfide and sodium sulfate. Degassing can be performed in a twin screw extruder or in conventional degassing apparatuses. Subsequently the cellulose is fed to a belt filter where excess acid and sodium sulfate are removed. Finally, dewatering is performed on the belt filter. The other methods require no degassing so that the precipitated cellulose can be fed directly to the belt filter for removing the cellulose solvent. The still moist material removed from the belt filter comes on the market without drying when intended for use in papermaking and wastewater technology.

The inventive method has the following advantages:
- one can use additives unstable in the system, such as cationizing agents or solvents thereof (e.g. water);
- the desired particle shape and particle size are produced in a single process step;
- a wide spectrum of particle shapes is permitted by a change in process parameters;
- there is a continuous process from cellulose solution to commercial article;
- there is very fast production change with an extremely low volume of waste.

The invention will be explained in more detail with reference to examples which do not restrict the scope.

EXAMPLE 1

Via metering pumps one feeds 208 l/h viscose (10% cellulose content), 33.3 l/h cationizing agent Catiofast PR 8106, BASF (12% active substance content) and 194 l/h dilution water to the mixing element, a Hed reactor HED 2000/50 B, jointly on the intake. The 3 components are homogenized at a speed of 3000 $min^{-1}$ and a circumferential speed of 12 m/sec. The obtained cationized cellulose solution with 4.8% cellulose content is supplied directly to regeneration in the Dispax reactor DR 3/6 246 S. A mixing nozzle is installed in the inlet port of the Dispax reactor in such a way that the mixing nozzle consisting of 11 single pipes leads to just before the first dispersing zone. Via the mixing nozzle one adds 500 l/h 5% sulfuric acid. Use of the mixing nozzle ensures that the viscose solution is not prematurely decomposed but is dispersed with the sulfuric acid in the shear zone to the particle size necessary for application of the cationic cellulose and is only then regenerated into cellulose. The Dispax reactor is operated at a speed of 8000 $min^{-1}$ and a circumferential speed of 21 m/sec.

All components are added at room temperature. The heat tonality of the viscose decomposition and the energy consumption of the Dispax reactor increase the temperature up to the outflow by 10° C. to about 30° C.

The outflow of the Dispax reactor opens into the inflow of a twin screw extruder with a degassing zone, where $CS_2$ and $H_2S$ are removed.

The degassed reaction mixture is fed to a belt filter with a plurality of washing zones, neutralization and pressing zone. The product removed from the belt filter contains 85% water along with cationic cellulose. The washing waters contain only traces of cationizing agent. The cationicity of the cellulose is determined as follows.

Product obtained by the above method is mixed with an excess of standardized centinormal sodium polyethylene sulfonic acid (Na-PES) and stirred for 1 hour. Then the solids are separated by centrifugation and an aliquot of the clear supernatant titrated against centinormal polydiallyldimethylammonium chloride (polyDADMAC) in the particle charge detector. From the consumption of polyDADMAC one calculates the charge of the product.

The cationicity measured by back titration is generally higher than the directly measured cationicity. This can be explained by the fact that during back titration the reagent can also penetrate into the cellulose structure by reason of the longer duration and thus also react with the less accessible charge carriers.

The cationicity of the cellulose ascertained by this method is 900 $\mu$eq/g dry substance.

EXAMPLE 2

A cellulose solution in lithium chloride, dimethylacetamide (DMA) and water is produced as follows.

Bleached, moist-stored pulp is added to a mixture of lithium chloride and dimethylacetamide so that the components are present in the following ratio: 5 parts cellulose (dry), 11 parts lithium chloride, 82 parts dimethylacetamide and some water (from the moist pulp).

This mixture is homogenized with a high-shear stirrer and held under vacuum at 80° C. until the water content has sunk to 3%. Dry nitrogen gas is bubbled through the mixture in order to support the water removal.

The arising suspension is cooled to 5° C. and stored for one day at this temperature. Dissolution of the suspended cellulose is supported by periodic stirring.

A 40 wt % aqueous solution of a polydiallyldimethylammonium chloride (available under the trade name Floerger FL 45 C) is used as a cationizing agent.

Via metering pumps one feeds 429.6 kg/h cellulose solution and 5.4 kg/h cationizing agent to the mixing element, Hed reactor HED 2000/50B, jointly on the intake, homogenizing being performed as in Example 1.

This cellulose solution is fed for regeneration to a Dispax reactor 3/6 246 P as in Example 1. At a cellulose solution throughput of 435 l/h one adds 500 l/h water instead of sulfuric acid via the mixing nozzle as a nonsolvent. The regenerated cationic cellulose is washed and thickened on a belt filter.

EXAMPLE 3

In a twin screw extruder with a degassing zone and parallel screws one adds 350 g/min bleached hardwood pulp continuously via a metering twin screw. A mixture of N-methylmorpholine-N-oxide, cationizing agent polydiallyldimethylammonium chloride (available under the trade name Floerger FL 45 C with 40% active content in water) and gallic acid propyl ester in the ratio 97.8:2.2:0.01 is metered at 70° C. in a storage vessel as a melt directly into the draw-in zone of the extruder. The dwell time in the extruder is 4 min at 160° C. The obtained cationic cellulose solution is supplied directly to a Dispax reactor 3/6 246 P, where 11.7 l/min water or washing water containing N-methylmorpholine-N-oxide from the following belt filter is added via the mixing nozzle. The regenerated cellulose is freed of cellulose solvent and thickened via the belt filter.

What is claimed is:

1. A method for producing longitudinally oriented, fibrous, cationized cellulose particles, characterized in that a cationizing agent is added to a cellulose solution, the cellulose solution mixed with cationizing agent is dispersed in a regenerant, the dispersion taking place under shear load, and the cellulose is regenerated and precipitated directly in dispersed form into longitudinally oriented, fibrous, cationized cellulose particles.

2. The method of claim 1, characterized in that longitudinally oriented cellulose solution dispersion drops are formed in the regenerant.

3. The method of claim 2, characterized in that the regeneration and precipitation take place under high shear load.

4. The method of claim 2, characterized in that the cellulose solution is mixed with a cationizing agent before being dispersed in the regenerant.

5. The method of claim 1, characterized in that the regeneration and precipitation take place under high shear load.

6. The method of claim 5, characterized in that the cellulose solution is mixed with a cationizing agent before being dispersed in the regenerant.

7. The method of claim 1, characterized in that the cellulose solution is mixed with a cationizing agent before being dispersed in the regenerant.

8. The method of claim 7, characterized in that the addition of cationizing agent takes place shortly before the addition of regenerant.

9. The method of claim 1, characterized in that the dispersion and regeneration and precipitation are performed at a temperature greater than room temperature.

10. The method of claim 9 wherein said temperature is from 40 to 85° C.

11. The method of claim 1, characterized in that the cellulose concentration in the cellulose solution is less than 10%.

12. The method of claim 1, characterized in that N-methylmorpholine-N-oxide, lithium chloride-dimethylacetamide, tetraamminecopper-copper(II) hydroxide are used as the solvent for the cellulose or the viscose process.

13. The method of claim 1, characterized in that the regenerated cellulose particles are supplied for degassing to a twin screw extruder.

14. The method of claim 1 characterized in that the cellulose concentration in the cellulose solution is 4 to 8%.

* * * * *